United States Patent [19]

Moro

[11] Patent Number: 5,748,788
[45] Date of Patent: May 5, 1998

[54] IMAGE PROCESSING METHOD AND APPARATUS

[75] Inventor: Takahiro Moro, Shiki, Japan

[73] Assignee: Cannon Kabushiki Kaisha, Tokyo, Japan

[21] Appl. No.: 704,379

[22] Filed: Aug. 28, 1996

Related U.S. Application Data

[63] Continuation of Ser. No. 127,505, Sep. 28, 1993, abandoned.

[30] Foreign Application Priority Data

Sep. 29, 1992 [JP] Japan .................. 4-259259

[51] Int. Cl.$^6$ ........................ G06K 9/36
[52] U.S. Cl. .............. 382/243; 358/433; 382/246; 382/268
[58] Field of Search .................. 382/199, 248, 382/243, 266, 268; 358/261.3, 261.2, 430, 432, 433

[56] References Cited

U.S. PATENT DOCUMENTS

| | | | |
|---|---|---|---|
| 4,797,945 | 1/1989 | Suzuki et al. | 382/41 |
| 4,821,119 | 4/1989 | Gharavi | 358/136 |
| 5,023,919 | 6/1991 | Wataya | 382/54 |
| 5,109,438 | 4/1992 | Alves et al. | 382/56 |
| 5,241,395 | 8/1993 | Chen | 382/56 |
| 5,282,255 | 1/1994 | Bovik et al. | 382/56 |
| 5,561,608 | 10/1996 | Shimoda et al. | 348/420 |
| 5,576,767 | 11/1996 | Lee et al. | 348/413 |

*Primary Examiner*—Joseph Mancuso
*Attorney, Agent, or Firm*—Fitzpatrick, Cella Harper & Scinto

[57] ABSTRACT

A noise reduction apparatus in which decoded image data is input to a block division circuit which divides the input image into blocks each consisting of N×N pixels. A process block determination circuit determines the presence/absence of an edge from estimated values of four corner points of an objective block divided by the block division circuit. The process block determination circuit determines the size of a process block in accordance with the determination result. A linear interpolation circuit performs linear interpolation of the process block determined by the process block determination circuit, and outputs corrected image data.

12 Claims, 5 Drawing Sheets

IMAGE PROCESSING METHOD AND APPARATUS

This application is a continuation of Application Ser. No. 08/127,505 filed Sep. 28 1993, now abandoned.

BACKGROUND OF THE INVENTION

1. Field of the Invention

The present invention relates to a noise reduction apparatus for reducing noise in image information and, more particularly, to an image processing method and apparatus for eliminating block distortion caused by block coding using an orthogonal transform such as discrete cosine transform.

2. Related Background Art

A block coding scheme is known as a method of compressing image information with high-efficiency coding, in which a frame is divided into a plurality of blocks, and coding (e.g., a discrete cosine transform) is performed on each block. A block distortion in which a block boundary is visually noticeable in a flat image portion, occurs in an image which is compressed and expanded by such a block coding scheme. It is important to eliminate this block distortion.

This block distortion is eliminated in a conventional scheme as follows. After a coded block is decoded, four corner points of an objective block are defined as four objective corner points. The gradation level value of an objective corner point is estimated from the current values of four gradation levels of the objective corner point and three adjacent corner points of three neighboring blocks, as shown in FIG. 2. More specifically, as shown in FIG. 2, pixels of the four corner points of the objective block are defined as P00, P01, P10, and P11, and pixels of the adjacent corner points of the neighboring blocks are defined as A00, A01, A10, A11, B00, B01, B10, B11, C00, C01, C10, and C11. The gradation level of the pixel P00 is estimated from the current values of the pixel P00 and the pixels A00, B00, and C00.

A difference between this estimated value and the current value is obtained. More specifically, differences between the estimated values of the four corner points of the objective block and the current values thereof are obtained. These four differences are linearly coupled to correct each pixel value in the objective block. That is, the area inside the block is linearly interpolated using the differences of the four corner points.

In estimating the gradation level values of the four corner points, an average value of the differences with the objective corner points, except for differences exceeding a threshold value Th, is defined as an estimated value. The corner points having differences exceeding the threshold value Th are eliminated to prevent blurring of an edge when the objective corner point is accidentally located at an edge portion of an image.

The above conventional scheme has the following drawback. That is, since the size of a process block subjected to noise elimination is fixed, an edge tends to be included in a block when the size of the process block is increased. The block distortion cannot be effectively eliminated. To the contrary, when the size of the process block is reduced, a block distortion elimination effect is degraded.

All of the pixel values within the objective process block are linearly interpolated by the estimated values of the four corner points of the process block. For this reason, even if an edge is included in the process block, the process is performed under the condition that the difference between the estimated value and the current value is small. A difference between the blocks may be increased, resulting in an unnatural image.

SUMMARY OF THE INVENTION

The present invention has been made in consideration of the above situation, and has as its object to eliminate block distortion in an input image and to obtain a good image.

In order to achieve the above object of the present invention, there is disclosed an image processing method for eliminating block distortion from an input image having block distortion, comprising the steps of:

inputting image data representing an image;

detecting an edge of the image;

determining a size of a block to be processed based on the detection of the edge; and correcting the image data based on the block having the determined size.

It is another object of the present invention to eliminate block distortion.

The above and other objects, features, and advantages of the present invention will be apparent from the detailed description and the appended claims in conjunction with the accompanying drawings.

DETAILED DESCRIPTION OF THE PREFERRED EMBODIMENTS

A preferred embodiment of the present invention will be described with reference to the accompanying drawings.

Figure 1:
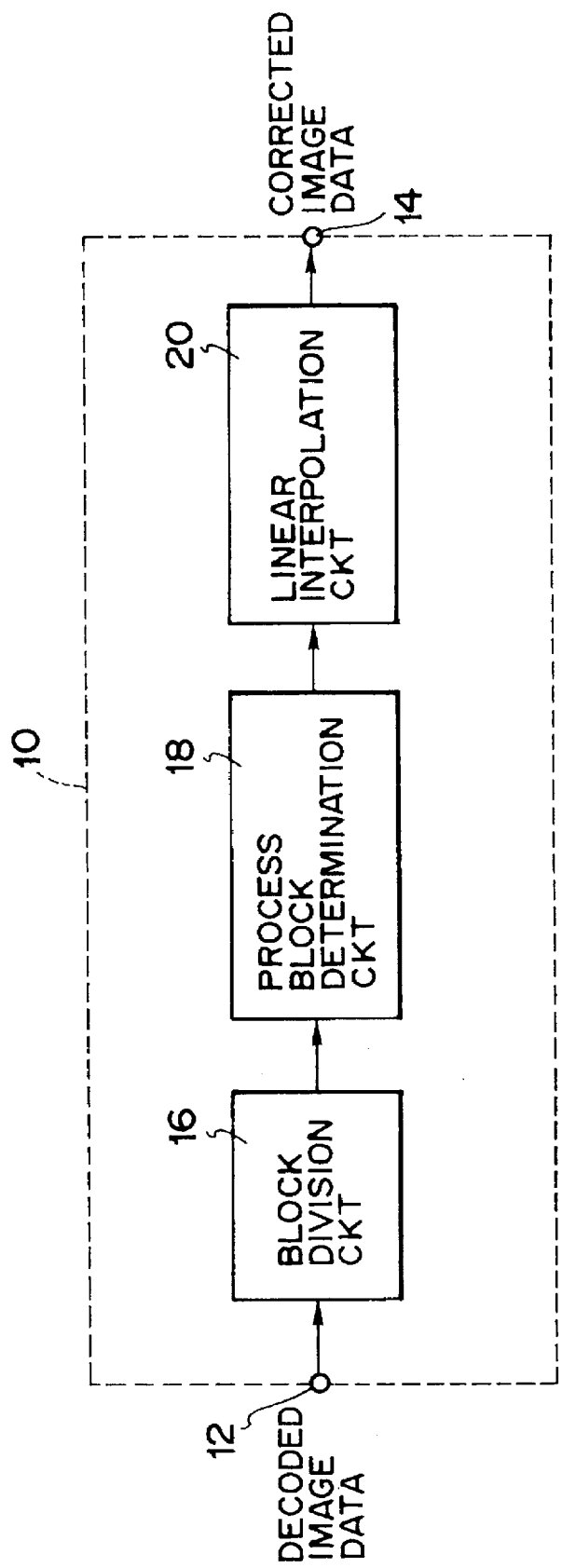
FIG. 1 is a block diagram showing the schematic arrangement according to an embodiment of the present invention.
Figure 2:
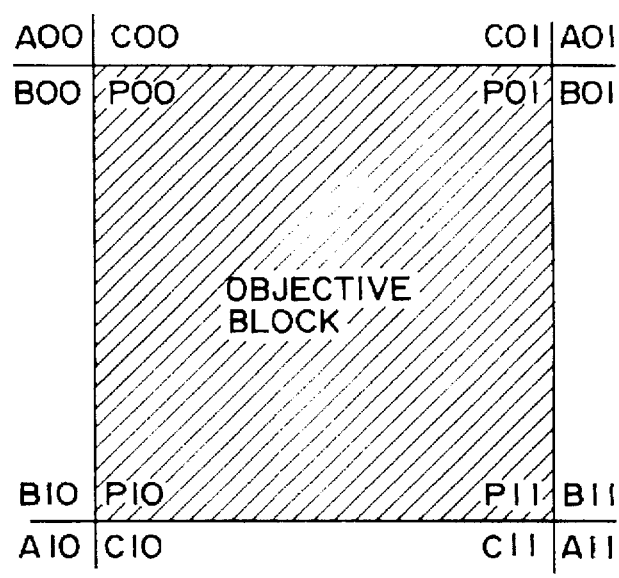
FIG. 2 is a view for explaining four corner points of an objective block and corner points of neighboring blocks.

FIG. 1 is a block diagram showing the schematic arrangement according to an embodiment of the present invention. A noise reduction apparatus 10 of this embodiment has an input terminal 12 for receiving image data (image data compressed and expanded by ADCT (Adaptive Discrete Cosine Transform) of a JPEG (Joint Photographic Expert Group) obtained by decoding coded block data. Image data in which noise is reduced is output from an output terminal 14.

In the noise reduction apparatus 10, a block division circuit 16 divides the image data from the input terminal 10 into blocks each consisting of N pixels×M pixels where each of N and M is a power of two. If the ADCT of the JPEG scheme is applied, N=M=8.

A process block determination circuit 18 estimates initial gradation level values of the four corner points of each block divided by the block division circuit 16. The presence/absence of an edge is judged from the estimated values of the four corner points. The size of a process block is subjected to a linear interpolation process to be described later, which is determined in accordance with the judgment result.

A linear interpolation circuit 20 linearly interpolates internal pixel values of the process block determined by the process block determination circuit 18. The corrected image data is output to the output terminal 14.

A method of estimating a gradation level in the process block determination circuit 18 is basically the same as a conventional method, but a threshold value Th for gradation level estimation is set as follows. That is, a block distortion in a flat image portion is assumed to be caused when an AC component except for a DC component is lost. A step difference caused in the block distortion is assumed to be a step amount corresponding to the quantization step size of the DC component in a decoded image. It may well be assumed therefore that a portion having a step difference larger than the above step amount is caused by an edge. Therefore, according to this embodiment, the threshold value Th is set to be twice the step amount corresponding to the quantization step size of the DC component in the decoded image.

Figure 3:
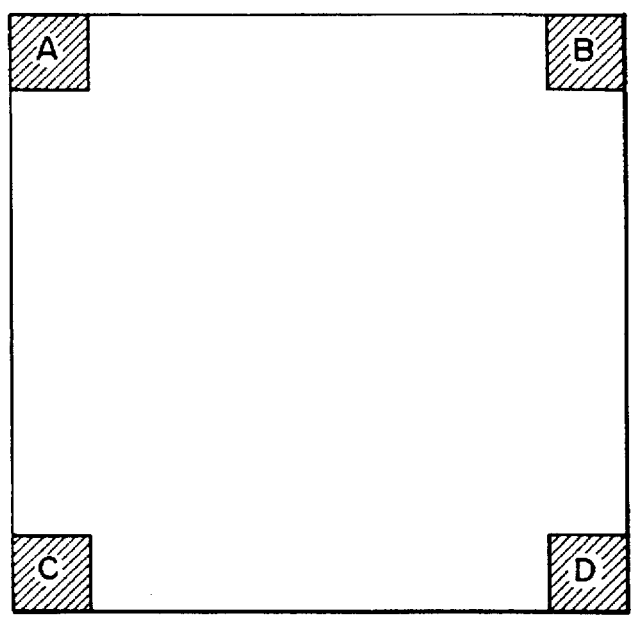
FIG. 3 is a view for explaining corner points for determining the presence/absence of an edge.

The presence/absence of an edge is judged as follows. That is, assume that the estimated values of four corner points are defined as A, B, C, and D, as shown in FIG. 3. If the absolute values of differences between A and remaining values, i.e., B, C, and D, that is, A–B, A–C, and A–D are smaller than a predetermined value (this value is experimentally determined), the absence of an edge in the objective block is judged. If any one of the absolute values exceeds the predetermined value, the presence of an edge is judged.

A method of determining a process block will be described below.

(Step 1)

Initial gradation level values of the four corner points of an objective block are estimated.

(Step 2)

Figure 4:
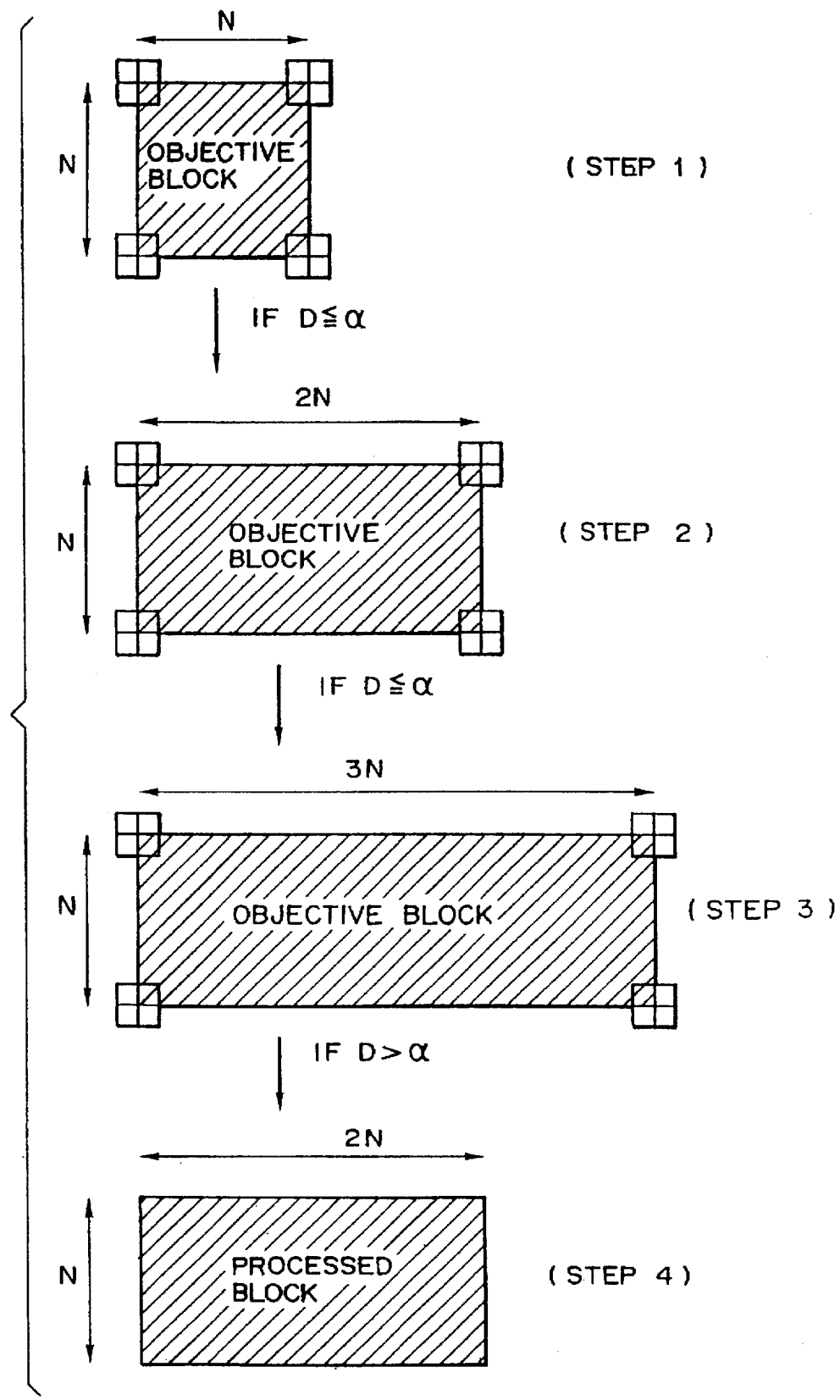
FIG. 4 is a view for explaining a flow for determining an objective process block.

If differences (D in FIGS. 4 and 5) of the estimated gradation levels of the four corner points are smaller than a given threshold value α, the absence of an edge within the objective block is determined. The objective block is enlarged by one block (N×N) in the negative horizontal direction.

(Step 3)

Steps 1 and 2 are repeated until the differences of the gradation levels of the four corner points of the objective block exceed the threshold value α.

(Step 4)

For each objective block whose differences of the gradation levels of the four corner points are larger than the threshold value α, the size of the objective block is reduced by N×N (one block) in the horizontal direction. The reduced block is defined as a process block. That is, the state of the block is the immediately preceding state.

(Step 5)

If the differences of the gradation levels of the four corner points of the objective block, which levels are estimated in step 1, are larger than the threshold value α from the beginning, the presence of an edge in the objective block is judged. The objective block is divided into four blocks each having a size of (N/2)×(N/2).

(Step 6)

Figure 5:
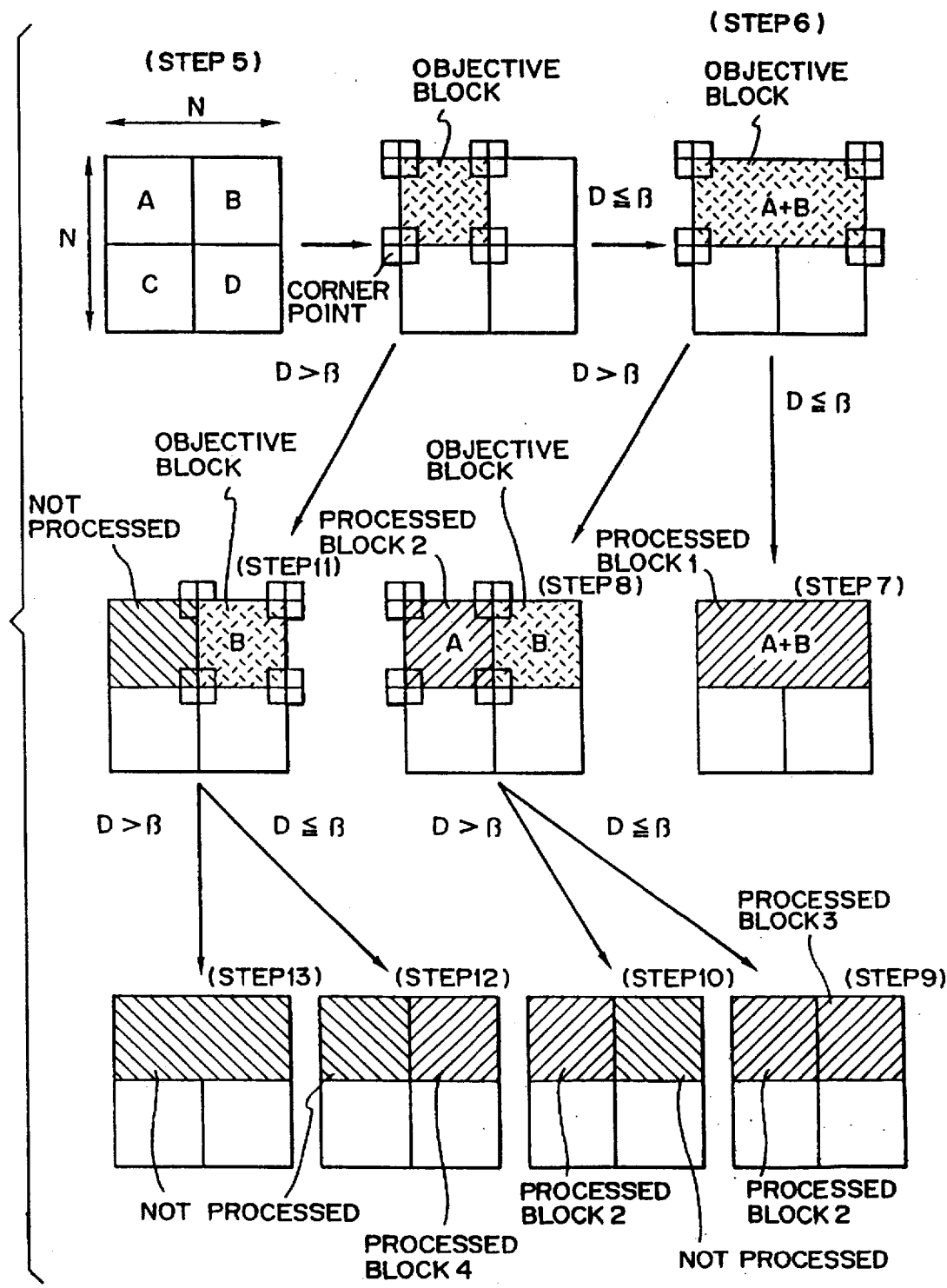
FIG. 5 is a view for explaining another flow for determining an objective process block.

A block A shown in FIG. 5 is defined as an objective block, and the gradation level values of the four corner points of this objective block are estimated. If differences of the estimated gradation level values are smaller than the threshold value β, the objective block is enlarged by one block, i.e., (N)×(N/2). A block (expressed as A+B) consisting of the block A and a block B is defined as an objective block.

(Step 7)

If differences of the estimated gradation levels of the four corner points of the objective block A+B are smaller than a threshold value β, the objective block is enlarged by one block, i.e., (N/2)×(N/2). A block (expressed as A+B) consisting of the block A and the block B is defined as an objective block 1.

(Step 8)

If differences of the estimated gradation levels of the four corner points of the objective block A+B are smaller than the threshold value β, the objective block is reduced by one block, i.e., (N/2)×(N/2). The block A is defined as a process block 2, and the block B is defined as an objective block.

(Step 9)

If differences of the estimated gradation levels of the block B are smaller than the threshold value β, the objective block B is defined as a process block 3.

(Step 10)

If differences of the estimated gradation levels of the four corner points of the block B are larger than the threshold value β, only the block A is defined as a process block 2, and no process is performed for the block B.

(Step 11)

The block A is defined as an objective block, and the gradation level values of the four corner points of this objective block are estimated. If differences of the estimated gradation level values are larger than the threshold value β, the block B is defined as the objective block, and no process is performed for the block A.

(Step 12)

If differences of the estimated gradation level values of the four corner points of the objective block B are smaller than the threshold value β, the block B is defined as a process block 4.

(Step 13)

If differences of estimated gradation level values of the four corner points of objective block B are larger than the threshold value β, no process is performed for the block B.

Similar processes as in steps 6 to 13 are performed for blocks C and D to determine process blocks.

Figure 6:
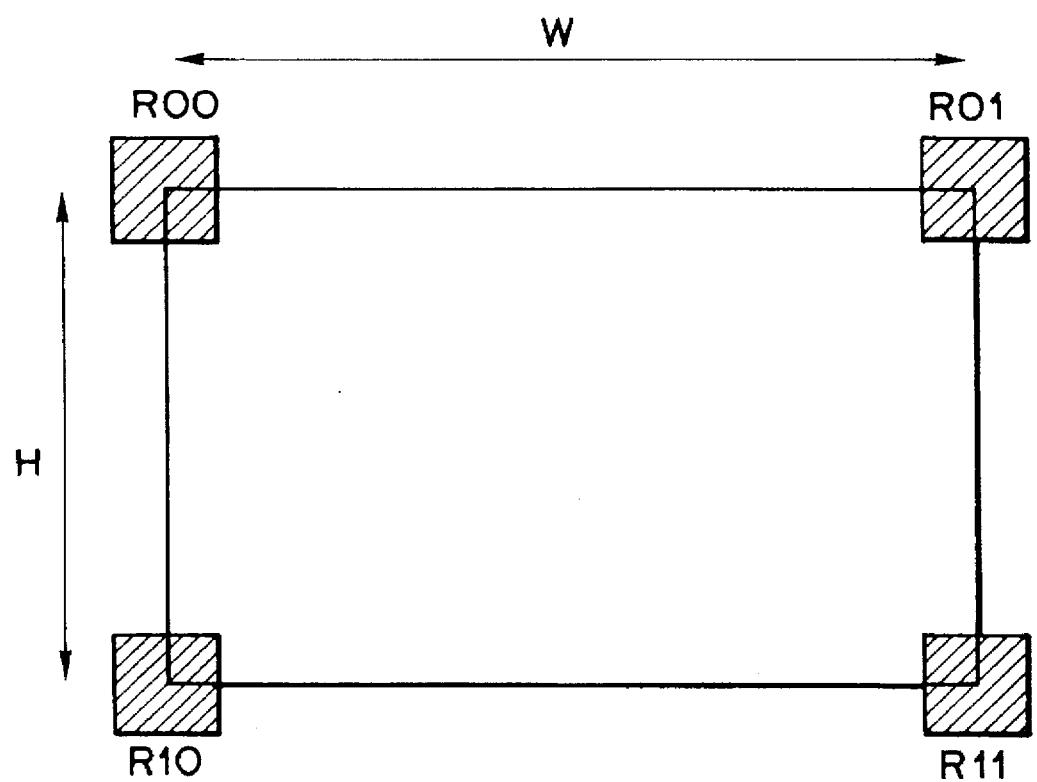
FIG. 6 is a view showing the structure of a determined process block.

The linear interpolation process in the linear interpolation circuit 20 will be described below. When the estimated values of the four corner points of the process block determined by the process block determination circuit 18 are defined as R00, R01, R10, and R11, and the width and height of the process block are defined as W and H, respectively, as shown in FIG. 6, a correction value, Qij, is defined as follows:

$$Qij=((R00*(W-1-i)+R01*i)*(H-1-j)+(R10*(W-1-i)+R11*i)*j)/((W-1)*(H-1))$$

for $0 \leq i < W$ and $0 \leq j < H$

Block reduction in the process block determination circuit 18 need not be limited to four divisions, but may be performed with a larger number of blocks, so that the block distortion can be effectively eliminated even in an image having a large number of edge portions.

The block division in the block division circuit 16 is not limited to a division into blocks each having a size of N×N. For example, the size may be N×M, and the values N and M may be changed in accordance with the types of input images. For example, if a flat image portion is long in the vertical direction, N is increased. To the contrary, if a flat image portion is long in the horizontal direction, M is increased, thereby effectively eliminating block distortions.

As can be readily understood from the above description, according to the present invention, the size of a process block is changed in accordance with the determination result representing the presence/absence of an edge, and then linear interpolation is performed, thereby properly eliminating the block distortions.

The present invention is not limited to the particular embodiment described above. Various changes and modifications may be made within the scope of the appended claims.

What is claimed is:

1. An image processing method comprising the steps of:

inputting image data encoded in blocks of a first block size;

decoding the input image data so as to obtain decoded image data;

detecting an edge in the image data based on the decoded image data;

identifying a block of the decoded image data on the basis of a detection result in said detecting step, wherein the block identified in said identifying step has a second block size different from the first block size; and eliminating a block distortion caused by encoding image data in blocks of the first block size, by correcting the decoded image data in the block identified in said identifying step.

2. A method according to claim 1, wherein said image data is obtained by decoding image data coded in units of blocks, each having N×M pixels.

3. A method according to claim 2, wherein presence of the edge is examined in units of the blocks.

4. A method according to claim 3, wherein the edge is detected on the basis of estimated values of four corner points of the block.

5. A method according to claim 1, wherein the block distortion is generated by a loss of an AC component.

6. A method according to claim 1, wherein said correction is linear interpolation.

7. An image processing apparatus comprising:

input means for inputting image data encoded in blocks of a first block size;

decoding means for decoding the input image data so as to obtain decoded image data;

detection means for detecting an edge in the image data based on the decoded image data;

identifying means for identifying a block of the decoded image data on the basis of a detection result by said detection means, wherein the block identified in said identifying step has a second block size different from the first block size; and eliminating means for eliminating a block distortion caused by encoding image data in blocks of the first block size, by correcting the decoded image data in the block identified by said identifying means.

8. An apparatus according to claim 7, wherein the image data is obtained by decoding image data coded in units of blocks, each having N×N pixels.

9. An apparatus according to claim 8, wherein presence of the edge is examined in units of the blocks.

10. An apparatus according to claim 9, wherein said detection means detects the edge on the basis of estimated values of four corner points of the block.

11. An apparatus according to claim 7, wherein the block distortion is generated by a loss of an AC component.

12. An apparatus according to claim 7, wherein said correction means performs linear interpolation.

* * * * *

UNITED STATES PATENT AND TRADEMARK OFFICE
CERTIFICATE OF CORRECTION

PATENT NO. : 5,748,788
DATED : May 5, 1998
INVENTOR(S) : Takahiro Moro

It is certified that error appears in the above-identified patent and that said Letters Patent is hereby corrected as shown below:

```
    On the title page: Item [73]
                              , the Assignee's name is
misspelled and should read --CANON KABUSHIKI KAISHA--.

Column 2, line 55, change "Group)" to --Group))--.

Column 4, line 55, change "(W - 1i) to
--(W - 1 - i)--
```

Signed and Sealed this

Tenth Day of November 1998

Attest:

BRUCE LEHMAN

*Attesting Officer*   Commissioner of Patents and Trademarks